(12) United States Patent
Sadhu et al.

(10) Patent No.: US 8,769,196 B1
(45) Date of Patent: Jul. 1, 2014

(54) CONFIGURING I/O CACHE

(75) Inventors: Vamsikrishna Sadhu, Karnataka (IN);
Brian S. Foster, Haverhill, MA (US);
Brian R. Gruttadauria, Sutton, MA (US); Joseph T. Frank, Boulder, CO (US); Suresh Kumar Kalidindi, Bangalore (IN)

(73) Assignee: Lenovo (Singapore) Pte. Ltd., Singapore (SG)

( * ) Notice: Subject to any disclaimer, the term of this patent is extended or adjusted under 35 U.S.C. 154(b) by 427 days.

(21) Appl. No.: 13/250,315

(22) Filed: Sep. 30, 2011

(51) Int. Cl.
*G06F 12/00* (2006.01)

(52) U.S. Cl.
USPC ............ 711/113; 711/100; 711/118; 711/154

(58) Field of Classification Search
CPC ... G06F 12/00; G06F 12/0866; G06F 3/0643; G06F 3/0674
USPC .......................... 711/100, 113, 117, 118, 154
See application file for complete search history.

(56) References Cited

U.S. PATENT DOCUMENTS

| | | | | |
|---|---|---|---|---|
| 5,806,085 A | * | 9/1998 | Berliner | 711/113 |
| 5,809,543 A | * | 9/1998 | Byers et al. | 711/162 |
| 7,216,199 B2 | * | 5/2007 | Mizuno | 711/114 |

* cited by examiner

*Primary Examiner* — Tuan Thai
(74) *Attorney, Agent, or Firm* — John L. Rogitz; John M. Rogitz

(57) ABSTRACT

A method is used for configuring I/O cache. A file system and a disk volume are identified. The file system is mounted on the disk volume. A cache mapper logical volume is created in response to a cache creation request. A cache volume is dynamically created from an existing cache storage unit, where the cache mapper logical volume is mounted on the disk volume and the cache volume.

20 Claims, 6 Drawing Sheets

CONTROL FLOW ON CACHE I/O HIT

CONTROL FLOW ON CACHE I/O MISS

CONFIGURING I/O CACHE

BACKGROUND

1. Technical Field

This application relates to configuring I/O cache.

2. Description of Related Art

Storage devices are employed to store data that is accessed by computer systems. Examples of basic storage devices include volatile and non-volatile memory, floppy drives, hard disk drives, tape drives, optical drives, etc. A storage device may be locally attached to an input/output (I/O) channel of a computer. For example, a hard disk drive may be connected to a computer's disk controller.

As is known in the art, a disk drive contains at least one magnetic disk which rotates relative to a read/write head and which stores data nonvolatilely. Data to be stored on a magnetic disk is generally divided into a plurality of equal length data sectors. A typical data sector, for example, may contain 512 bytes of data. A disk drive is capable of performing a write operation and a read operation. During a write operation, the disk drive receives data from a host computer along with instructions to store the data to a specific location, or set of locations, on the magnetic disk. The disk drive then moves the read/write head to that location, or set of locations, and writes the received data. During a read operation, the disk drive receives instructions from a host computer to access data stored at a specific location, or set of locations, and to transfer that data to the host computer. The disk drive then moves the read/write head to that location, or set of locations, senses the data stored there, and transfers that data to the host.

Advances in semiconductor technology have lead to an increase in the use of a semiconductor solid state drive (also known as a solid state disk or SSD) which uses a flash memory as a storage device, in areas such as computer systems. Thus, in at least some cases there seems to be a trend towards the use of an SSD as a storage device instead of a magnetic disk. In spite of having features such as, for example, a relatively small storage capacity and a relatively high price, the SSD has some other features that can make it more attractive as a storage device than the conventional magnetic disk in at least some cases.

Features that can make SSDs preferable as storage devices are, for example, a fast access rate, high throughput, a high integration density, and stability against an external impact. SSDs can move much larger amounts of data and process far more I/O requests, per time period, than conventional magnetic disks. This allows users to complete data transactions much more quickly.

Furthermore, advances in manufacturing technologies for SSDs may reduce the production costs of SSDs and also increase the storage capacities of SSDs. These developments may provide further incentive to use SSDs in place of magnetic disks in at least some cases.

Solid state disk systems may also comprise communication controllers, such as Fibre Channel (FC) controllers, Ethernet mechanisms, ATA or serial ATA interfaces, or SCSI controllers for managing data communication with external computing devices.

A storage device may also be accessible over a network. Examples of such a storage device include network attached storage (NAS) and storage area network (SAN) devices. A storage device may be a single stand-alone component or be comprised of a system of storage devices such as in the case of Redundant Array of Inexpensive Disks (RAID) groups.

Virtually all computer application programs rely on such storage devices which may be used to store computer code and data manipulated by the computer code. A typical computer system includes one or more host computers that execute such application programs and one or more storage systems that provide storage.

The host computers may access data by sending access requests to the one or more storage systems. Some storage systems require that the access requests identify units of data to be accessed using logical volume ("LUN") and block addresses that define where the units of data are stored on the storage system. Such storage systems are known as "block I/O" storage systems. In some block I/O storage systems, the logical volumes presented by the storage system to the host correspond directly to physical storage devices (e.g., disk drives) on the storage system, so that the specification of a logical volume and block address specifies where the data is physically stored within the storage system. In other block I/O storage systems (referred to as intelligent storage systems), internal mapping technology may be employed so that the logical volumes presented by the storage system do not necessarily map in a one-to-one manner to physical storage devices within the storage system. Nevertheless, the specification of a logical volume and a block address used with an intelligent storage system specifies where associated content is logically stored within the storage system, and from the perspective of devices outside of the storage system (e.g., a host) is perceived as specifying where the data is physically stored.

In contrast to block I/O storage systems, some storage systems receive and process access requests that identify a data unit or other content unit (also referenced to as an object) using an object identifier, rather than an address that specifies where the data unit is physically or logically stored in the storage system. Such storage systems are referred to as object addressable storage (OAS) systems. In object addressable storage, a content unit may be identified (e.g., by host computers requesting access to the content unit) using its object identifier and the object identifier may be independent of both the physical and logical location(s) at which the content unit is stored (although it is not required to be because in some embodiments the storage system may use the object identifier to inform where a content unit is stored in a storage system). From the perspective of the host computer (or user) accessing a content unit on an OAS system, the object identifier does not control where the content unit is logically (or physically) stored. Thus, in an OAS system, if the physical or logical location at which the unit of content is stored changes, the identifier by which host computer(s) access the unit of content may remain the same. In contrast, in a block I/O storage system, if the location at which the unit of content is stored changes in a manner that impacts the logical volume and block address used to access it, any host computer accessing the unit of content must be made aware of the location change and then use the new location of the unit of content for future accesses.

One example of an OAS system is a content addressable storage (CAS) system. In a CAS system, the object identifiers that identify content units are content addresses. A content address is an identifier that is computed, at least in part, from at least a portion of the content (which can be data and/or metadata) of its corresponding unit of content. For example, a content address for a unit of content may be computed by hashing the unit of content and using the resulting hash value as the content address. Storage systems that identify content by a content address are referred to as content addressable storage (CAS) systems.

Some storage systems receive and process access requests that identify data organized by file system. A file system is a logical construct that translates physical blocks of storage on a storage device into logical files and directories. In this way, the file system aids in organizing content stored on a disk. For example, an application program having ten logically related blocks of content to store on disk may store the content in a single file in the file system. Thus, the application program may simply track the name and/or location of the file, rather than tracking the block addresses of each of the ten blocks on disk that store the content.

File systems maintain metadata for each file that, inter alia, indicates the physical disk locations of the content logically stored in the file. For example, in UNIX file systems an inode is associated with each file and stores metadata about the file. The metadata includes information such as access permissions, time of last access of the file, time of last modification of the file, and which blocks on the physical storage devices store its content. The file system may also maintain a map, referred to as a free map in UNIX file systems, of all the blocks on the physical storage system at which the file system may store content. The file system tracks which blocks in the map are currently in use to store file content and which are available to store file content.

When an application program requests that the file system store content in a file, the file system may use the map to select available blocks and send a request to the physical storage devices to store the file content at the selected blocks. The file system may then store metadata (e.g., in an inode) that associates the filename for the file with the physical location of the content on the storage device(s). When the file system receives a subsequent request to access the file, the file system may access the metadata, use it to determine the blocks on the physical storage device at which the file's content is physically stored, request the content from the physical storage device(s), and return the content in response to the request.

In general, since file systems provide computer application programs with access to data stored on storage devices in a logical, coherent way, file systems hide the details of how data is stored on storage devices from application programs. For instance, storage devices are generally block addressable, in that data is addressed with the smallest granularity of one block; multiple, contiguous blocks form an extent. The size of the particular block, typically 512 bytes in length, depends upon the actual devices involved. Application programs generally request data from file systems byte by byte. Consequently, file systems are responsible for seamlessly mapping between application program address-space and storage device address-space.

File systems store volumes of data on storage devices, i.e., collections of data blocks, each for one complete file system instance. These storage devices may be partitions of single physical devices or logical collections of several physical devices. Computers may have access to multiple file system volumes stored on one or more storage devices.

File systems maintain several different types of files, including regular files and directory files. Application programs store and retrieve data from regular files as contiguous, randomly accessible segments of bytes. With a byte-addressable address-space, applications may read and write data at any byte offset within a file. Applications can grow files by writing data to the end of a file; the size of the file increases by the amount of data written. Conversely, applications can truncate files by reducing the file size to any particular length. Applications are solely responsible for organizing data stored within regular files, since file systems are not aware of the content of each regular file.

Files are presented to application programs through directory files that form a tree-like hierarchy of files and subdirectories containing more files. Filenames are unique to directories but not to file system volumes. Application programs identify files by pathnames comprised of the filename and the names of all encompassing directories. The complete directory structure is called the file system namespace. For each file, file systems maintain attributes such as ownership information, access privileges, access times, and modification times.

File systems often utilize the services of operating system memory caches known as buffer caches and page caches. These caches generally consist of system memory buffers stored in volatile, solid-state memory of the computer. In this context, caching is a technique to speed up data requests from application programs by saving frequently accessed data in memory for quick recall by the file system without having to physically retrieve the data from the storage devices. Caching is also useful during file writes; the file system may write data to the memory cache and return control to the application before the data is actually written to non-volatile storage. Eventually, the cached data is written to the storage devices.

The state of the cache depends upon the consistency between the cache and the storage devices. A cache is "clean" when its contents are exactly the same as the data stored on the underlying storage devices. A cache is "dirty" when its data is newer than the data stored on storage devices; a cache becomes dirty when the file system has written to the cache, but the data has not yet been written to the storage devices. A cache is "stale" when its contents are older than data stored on the storage devices; a cache becomes stale when it has not been updated to reflect changes to the data stored on the storage devices.

In order to maintain consistency between the caches and the storage devices, file systems perform "flush" and "invalidate" operations on cached data. A flush operation writes dirty cached data to the storage devices before returning control to the caller. An invalidation operation removes stale data from the cache without invoking calls to the storage devices. File systems may flush or invalidate caches for specific byte-ranges of the cached files.

Many file systems utilize data structures mentioned above called inodes to store information specific to each file. Copies of these data structures are maintained in memory and within the storage devices. Modes contain attribute information such as file type, ownership information, access permissions, access times, modification times, and file size. Modes also contain lists of pointers that address data blocks. These pointers may address single data blocks or address an extent of several consecutive blocks. The addressed data blocks contain either actual data stored by the application programs or lists of pointers to other data blocks. With the information specified by these pointers, the contents of a file can be read or written by application programs. When application programs write to files, data blocks may be allocated by the file system. Such allocation modifies the inodes.

Additionally, file systems maintain information, called "allocation tables", that indicate which data blocks are assigned to files and which are available for allocation to files. File systems modify these allocation tables during file allocation and de-allocation. Most modern file systems store allocation tables within the file system volume as bitmap fields. File systems set bits to signify blocks that are presently allocated to files and clear bits to signify blocks available for future allocation.

SUMMARY OF THE INVENTION

A method is used for configuring I/O cache. A file system and a disk volume are identified. The file system is mounted on the disk volume. A cache mapper logical volume is created in response to a cache creation request. A cache volume is dynamically created from an existing cache storage unit, where the cache mapper logical volume is mounted on the disk volume and the cache volume.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

High-end data storage devices provide enhanced I/O performance through multi-spindle RAID configurations. Most general RAID configurations provide higher levels of sequential performance over single drive configurations, but the performance of highly random I/O workloads can suffer on any storage configuration built from rotating media devices.

Solid state drives have become a cost effective, power saving, performance solution for consumers and small businesses, but can trail traditional hard drives in terms of cost of capacity. Having a flash cache feature in data storage device allows users to combine a single SSD with a traditional RAID configuration and realize the performance benefits of the SSD without the added cost of moving to an entirely SSD based solution.

Figure 1:
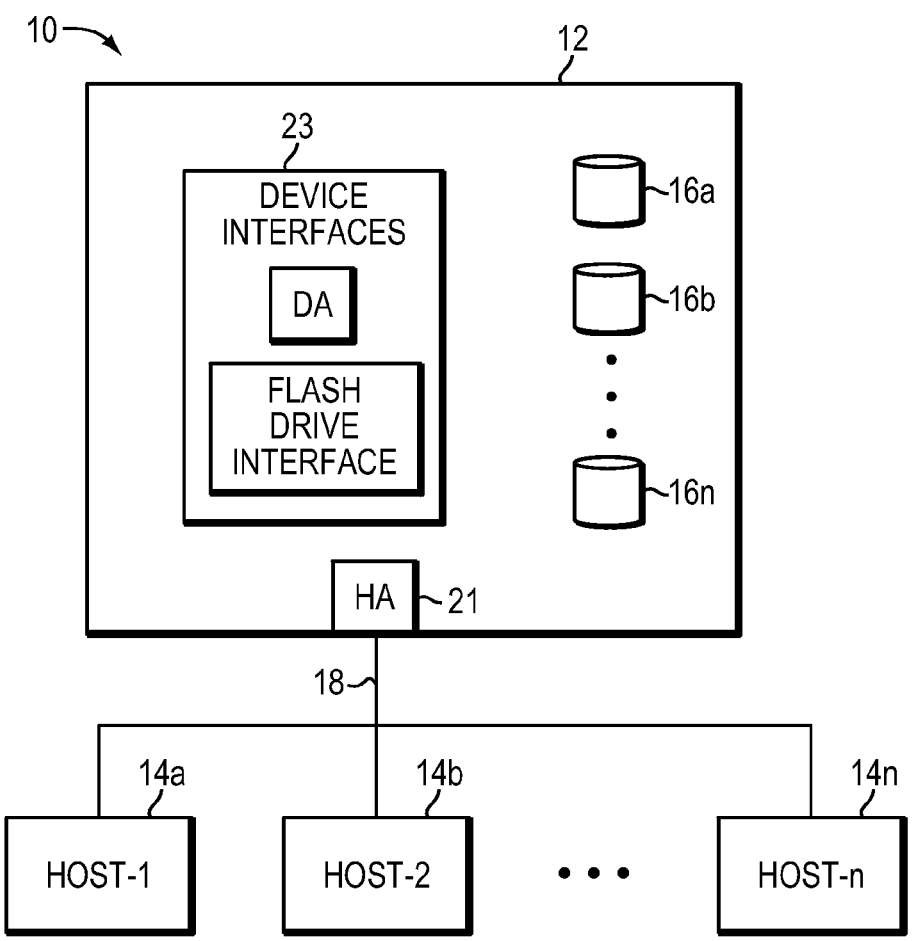
FIG. 1 is a block diagram illustrating an example embodiment that may utilize the techniques described herein.

Referring to FIG. 1, shown is an example of an embodiment of a system that may be used in connection with performing one or more implementations of the current techniques described herein. The system 10 includes a data storage system 12 connected to host systems 14a-14n through communication medium 18. In this embodiment of the computer system 10, the n hosts 14a 14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network or other wireless or other hardwired connection(s) by which the host systems 14a 14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the host computers 14a-14n and data storage system may all be located at the same physical site, or, alternatively, may also be located in different physical locations. The communication medium that may be used to provide the different types of connections between the host computer systems and the data storage system of the system 10 may use any of a variety of different communication protocols. Some or all of the connections by which the hosts and data storage system may be connected to the communication medium may pass through other communication devices, such as switching equipment and/or a phone line, a repeater, a multiplexer or a satellite.

Each of the host computer systems may perform different types of data operations in accordance with different types of tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, in an embodiment using the techniques herein. It should also be noted that an embodiment may include data storage arrays or other components from one or more vendors. In subsequent examples illustrating the techniques herein, reference may be made to a single data storage array by a vendor, such as by EMC Corporation of Hopkinton, Mass. However, as will be appreciated by those skilled in the art, the techniques herein are applicable for use with other data storage arrays by other vendors and with other components than as described herein for purposes of example.

The data storage system 12 may be a data storage array including a plurality of data storage devices 16a-16n. The data storage devices 16a-16n may include one or more types of data storage devices such as, for example, one or more disk drives and/or one or more solid state drives (SSDs). An SSD is a data storage device that uses solid-state memory to store persistent data. An SSD using SRAM or DRAM, rather than flash memory, may also be referred to as a RAM drive. SSD may refer to solid state electronics devices as distinguished from electromechanical devices, such as hard drives, having moving parts. Flash devices or flash memory-based SSDs are one type of SSD that contains no moving parts.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment.

Host systems provide data through channels to the storage systems, and the storage systems may also provide data to the host systems also through the channels. Data in a single data storage system, such as a single data storage array, may be accessed by multiple hosts allowing the hosts to share the data residing therein.

The data storage system 12 in the embodiment of FIG. 1 further comprises a host adaptor (HA) 21 (e.g., network interface card (NIC) or other network interface) coupled to the hosts 14a-14n via the communication medium 18 that may operate in accordance with the technique described herein. Device interfaces 23 may comprise device adaptors and interfaces (e.g., a flash drive interface).

As described above, the data storage system 12 may be a data storage array including a plurality of data storage devices 16a-16n in which one or more of the devices 16a-16n are flash memory devices employing one or more different flash memory technologies. In one embodiment, the data storage system 12 may be an Iomega® StorCenter storage system by EMC Corporation of Hopkinton, Mass. In the foregoing data storage array, the data storage devices 16a-16n may include a combination of disk devices and flash devices in which the flash devices may appear as standard drives to the various software tools used in connection with the data storage array. The disk devices may be any one or more different types of disk devices such as, for example, an ATA disk drive, FC disk drive, and the like. The flash devices may be constructed using different types of memory technologies such as non-volatile semiconductor NAND flash memory forming one or more SLC devices and/or MLC devices. Additionally, flash memory devices and disk devices are two exemplary types of devices that may be included in a data storage system used in connection with the techniques described herein.

Thus, the storage system may include a variety of storage devices with different physical and performance characteristics (e.g., types of storage devices, disk speed such as in RPMs), RAID levels and configurations, different replication services (such as particular software used in the data storage system providing data replication), allocation of cache, and processors used to service an I/O request.

Figure 2:
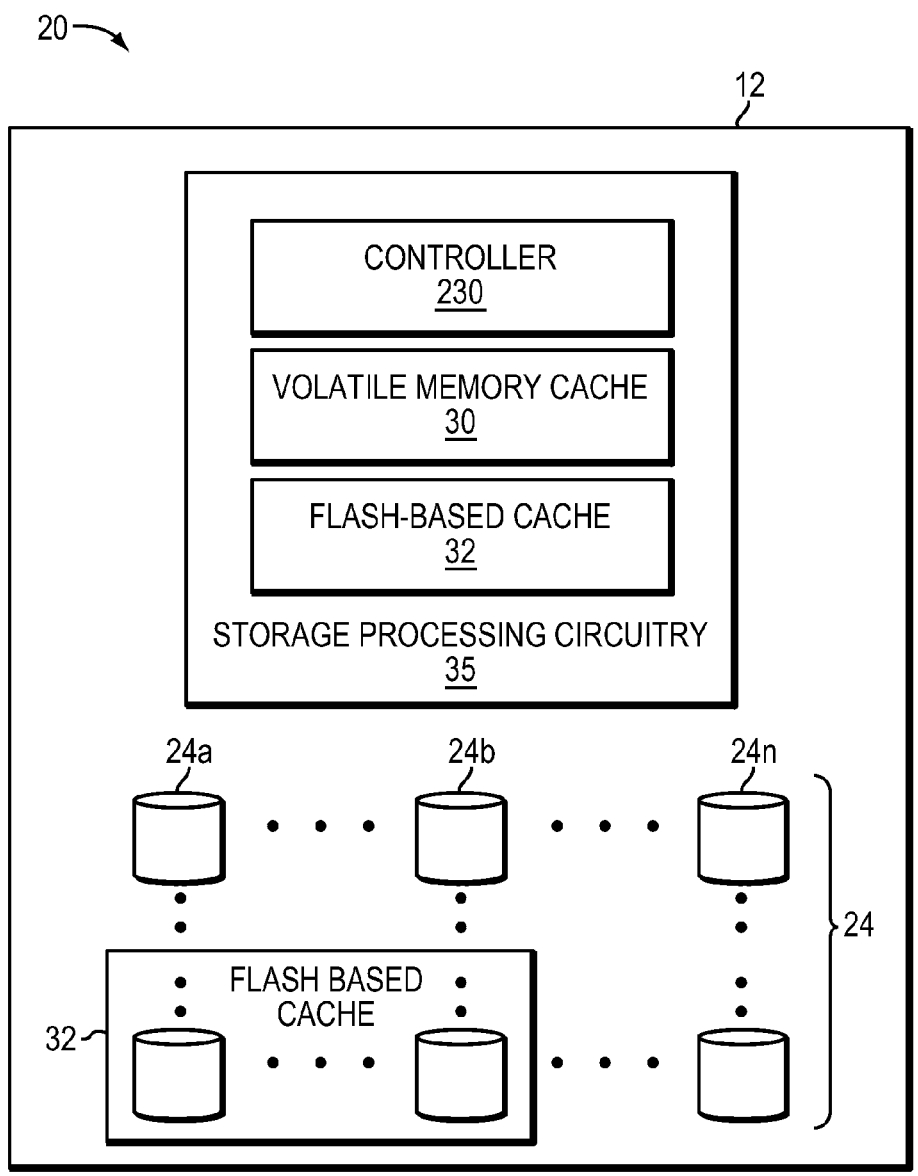
FIG. 2 is a block diagram illustrating an example embodiment in additional detail that may utilize the techniques described herein.

Referring to FIG. 2, shown is a more detailed representation of components that may be included in an embodiment using the techniques herein. In the example 20, a data storage system 12 may include disks 24 as described above. The data storage system 12 may also include storage processing circuitry 35 having a controller 230, a flash-based cache 32, and optionally a volatile memory cache 30 (e.g., DRAM) as well. As described in more detail below, one or more of the disks 24 may be, include, or be included in a flash-based disk, and cache 32 may include such flash-based disk.

The flash-based cache 32 is a flash-based memory or solid state drive (SSD) which is non-volatile to store data persistently. During normal operations, data may be stored to a portion of the component 32, and data may be read from disk into a portion of component 32.

The controller 230 may be configured to perform data storage operations (e.g., file system operations) on behalf of the hosts of FIG. 1 during normal operation using the flash based cache 32 and the disks 24. During normal operation in the case of a write request, when a host sends a request to write data to the data storage system, the controller 230 may store the data of the write request to a portion of the component 32. During normal operation in the case of a read request, when a host sends a request to read data from the data storage system, the controller 230 reads the data of the read request from component 32 if such data is available there. Also, depending on the implementation, the controller may be configured to perform, for example, as a background process, copying of data from disks 24 to a portion of the component 32 and/or from component 32 to disks 24.

As will be appreciated by those skilled in the art, the data storage 12 may also include other components than as described for purposes of illustrating the techniques herein.

Figure 3:
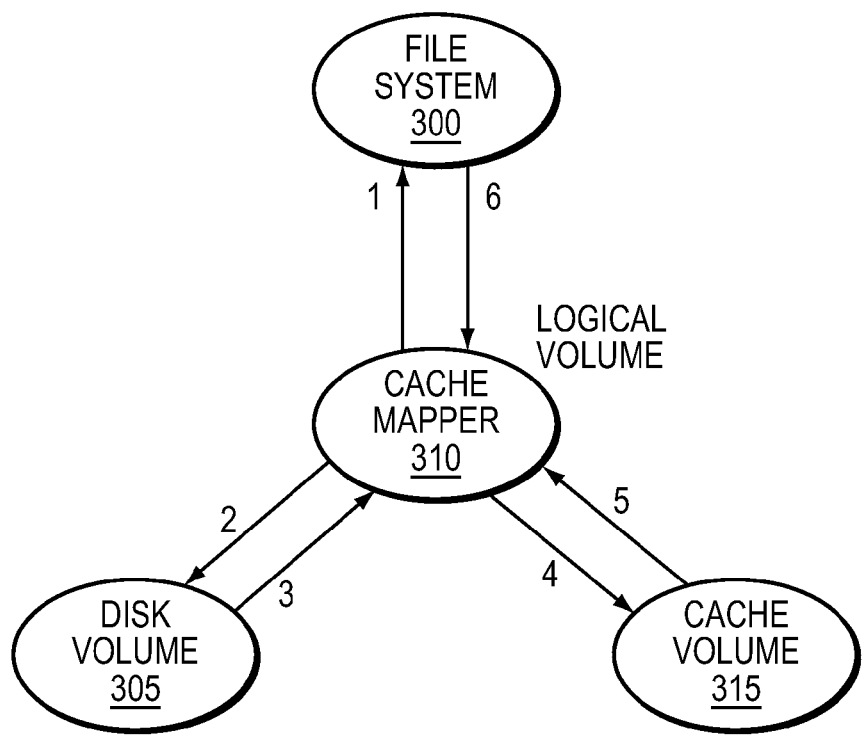
FIG. 3 is a state diagram illustrating an I/O state machine for disruptive I/O cache.

FIG. 3 depicts a conventional I/O state machine illustrating disruptive I/O cache. I/O flows between a file system 300, cache mapper 310, disk volume 305, and cache volume 315 according to the numbered steps. FIG. 3 also illustrates the layout of the file system 300 and the volumes 305-315 with respect to each other. In this configuration, the cache mapper 310 is a logical volume is created and mounted on top of the user volume 305 and the cache volume 315. The cache mapper 310 is created as part of the cache constructor request. The file system 300 is mounted on cache mapper 310 and the file system 300 communication directly (and only) with the cache mapper 310.

In step 1, I/O operation communication with the hosts 14a-n flow from the file system 300 to the cache mapper 310. In step 2, the I/O operation may flow from the cache mapper 310 to the disk volume 305. In step 3, I/O operation may flow from the disk volume 305 back to the cache mapper via a callback to the cache mapper 310. In step 4, the I/O operation flows from the cache mapper 310 to the cache volume 315 and process accordingly. In step 5, the I/O operation flows from cache volume 315 back to the cache mapper 310 via a callback to the cache mapper 310. From there, in step 6, the I/O operation is transmitted from the cache mapper 310 back to the file system 300, where they then return back to the initiating host 14a-n.

Because the file system 300 is mounted on top of the logical volume represented by the cache mapper 310, this configuration requires, when creating a cache volume 315, making sure the disk volume 305 is not mounted. Thus, the cache volume 315 must be configured before the disk volume 305 is mounted. Similarly, to reconfigure the cache volume 315, the cache mapper 310 logical volume has to be unmounted from the host. Such an arrangement results in a disruptive I/O cache volume and, consequently, cache can only be configured statically.

The following text illustrates a situation using a cache command line interface (CLI) where a cache volume 315 creation is attempted while the file system 300 is already mounted.

Syntax of the CLI:
Cache Creation:
./flashcache_wb_create -s <size of cache in sectors> -b <block size in sectors> <cache device name> <cache device path> <disk device path>
Cache Removal:
./flashcache_wb_destroy <cache device name>
SSD Device: /dev/sde
Disk Device: /dev/sdi (ext2 file system created)
root@storage:/# mount /dev/sdi /mnt/vamsi
root@storage:/# mount
rootfs on / type rootfs (rw)
/dev/root.old on /initrd type ext2 (rw,relatime, errors=continue)
none on / type tmpfs (rw,relatime,size=51200k,nr_inodes=257277)
/dev/sdf1 on /boot type ext2 (rw,relatime,errors=continue)
/dev/loop0 on /mnt/apps type cramfs (ro,noatime)
/dev/loop1 on /etc type ext2 (rw,sync,noatime)

```
/dev/loop2 on /oem type cramfs (ro,relatime)
proc on /proc type proc (rw,relatime)
none on /proc/bus/usb type usbfs (rw,relatime)
none on /proc/fs/nfsd type nfsd (rw,relatime)
none on /sys type sysfs (rw,relatime)
devpts on /dev/pts type devpts (rw,relatime,gid=5,
    mode=620)
tmpfs on /mnt/apps/lib/init/rw type tmpfs (rw,nosuid,rela-
    time,mode=755)
tmpfs on /dev/shm type tmpfs (rw,nosuid,nodev,relatime)
/dev/mapper/7d8e2541_vg-vol1 on /mnt/soho_storage
    type xfs
    (rw,noatime,attr2,inode64,logbufs=8,noquota)
/dev/sdi on /mnt/vamsi type ext2 (rw,relatime,
    errors=continue)
Result: Mount /dev/sdi to /mnt/vamsi folder is Successful.
root@storage:/# ./flashcache_wb_create -s 1g -b 4k cache-
    dev3 /dev/sde
/dev/sdi
cachedev cachedev3, ssd_devname /dev/sde, dis-
    k_devname /dev/sdi
block_size 8, cache_size 2097152
device-mapper: reload ioctl failed: Device or resource busy
Command failed
```

As shown in the CLI display information, a cache volume 315 creation failed because the file system 300 is mounted and running. Consequently, at run time, the cache volume 315 cannot be created.

Figure 4:
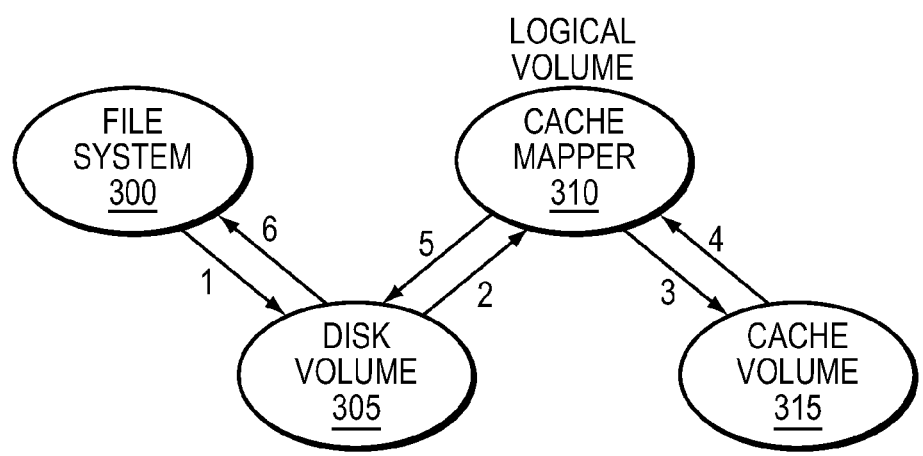
FIG. 4 is a state diagram illustrating an example embodiment an I/O state machine for nondisruptive I/O cache that may utilize the techniques described herein.

FIG. 4 illustrates an example embodiment of an I/O state machine for nondisruptive I/O cache implemented according to current techniques described herein. The disk volume 305 may be a logical volume built on a RAID group that is built from disks 24. The cache volume 315 may be a logical volume build from flash bashed cache 32. The cache mapper 310 may be represented as a logical volume that can be implemented in software (e.g., pseudo code described below) and executed by the storage processing circuitry 35. In this configuration, the disk volume 305 is set up first, and then the file system is mounted on top of the disk volume 305. A cache mapper 310 logical volume is created as part of the cache configuration, where the cache mapper 310 controls I/O caching. Because the file system 300 interfaces directly with the disk volume 305, there is no need to unmount the logical volume. Thus, cache configuration may be performed dynamically. During dynamic cache creation, I/O operations may continue to occur. Therefore, while cache creation is in process, I/O operations may be queued in the cache mapper 310. Once the cache configuration is complete, i.e., the cache volume 315 has been created and the cache is ready to process I/O operations, any queued I/O operations may be processed as described below and with reference to FIGS. 5 and 6.

I/O operations flow between the file system and volumes 305-315 as shown in the numbered steps. For example, in step 1, I/O operation communication received from hosts 14a-n flow from the file system 300 to the disk volume 305. If the cache volume 315 has not been configured, I/Os flow between the file system 300 and the disk volume 305 in the usual manner. In step 2, when cache is configured, the cache mapper 310 creates a cache volume 315. I/O operations may be queued by the cache mapper 310 until the cache volume 315 is completed. In step 3, I/O operations flow to the cache volume 315 and are processed according to cache hit or miss techniques described below in conjunction with FIGS. 5 and 6. In step 4, I/O operations flow back to the cache mapper 310 via a callback to the cache mapper 310. In step 5, I/O operations flow from the cache mapper 310 back to the disk volume 305 via a callback to the disk volume 305. In step 6, I/O operations may flow to the file system 300 and subsequently to the initiating host 14a-14n.

Figure 5:
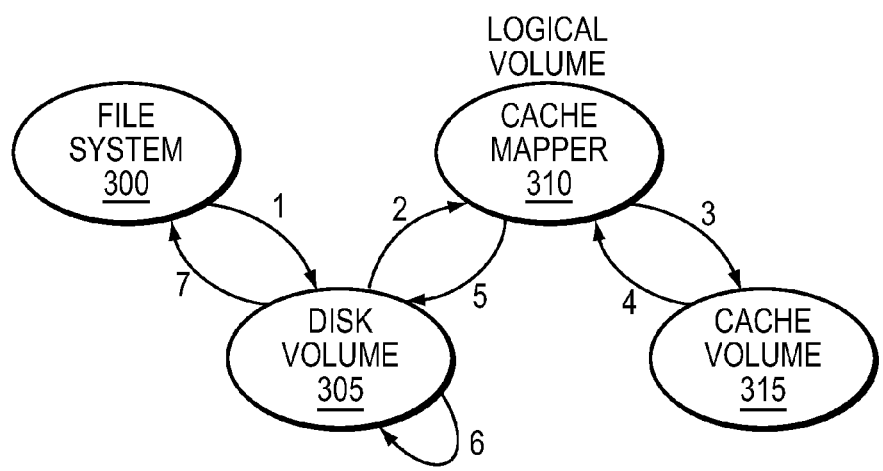
FIG. 5 is a state diagram illustrating an example embodiment of an I/O flow control that may utilize the techniques described herein.

FIG. 5 depicts an example embodiment illustrating I/O control flow after cache configuration has been performed. I/O flow is shown for the case where there is a cache I/O hit and proceeds according to the numbered steps. For example, in step 1, I/O operations received from hosts 14a-n flow from the file system 300 to the disk volume 305. In step 2, since the cache volume 315 has been configured, the cache mapper 310 has created a cache volume 315, thus, I/O operations flow from the disk volume 305 to the cache mapper 310 via a disk volume callback to the cache mapper 310. In step 3, a cache hit is detected, therefore, I/O operations flow from the cache mapper 310 to the cache volume 315 and are processed by an appropriate cache storage unit. In step 4, I/O operations flow back to the cache mapper 310 via a callback to the cache mapper 310. In step 5, I/O operations flow from the cache mapper 310 to the disk volume 305. In step 6, I/O operations may be further processed by the disk volume 305. In step 7, the processed I/O returns back to the file system 300 and ultimately to the initiating host 14a-14n.

Figure 6:
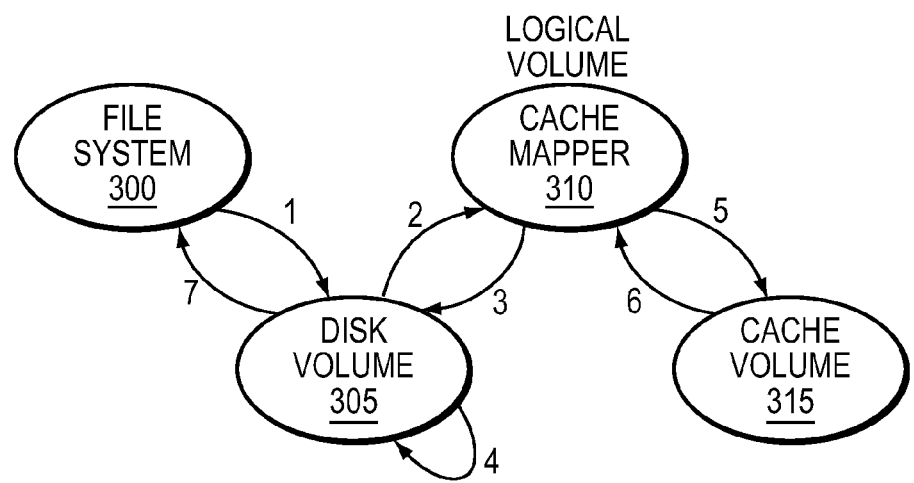
FIG. 6 is a state diagram illustrating an example embodiment of an I/O flow control that may utilize the techniques described herein.

FIG. 6 depicts an example embodiment illustrating I/O control flow after cache configuration has been performed. However, in this example, I/O flow is shown for the case where there is a cache I/O miss and proceeds according to the numbered steps. For example, in step 1, I/O operations received from hosts 14a-n flow from the file system 300 to the disk volume 305. In step 2, I/O operations flow from the disk volume 305 to the cache mapper 310 via a disk volume callback to the cache mapper 310. In step 3, a cache miss has been detected; therefore, I/O operations flow from the cache mapper 310 back to the disk volume 305. In step 4, I/O operations are processed by the disk volume 305. In step 5, I/O control flow is directed to the cache volume 315, where the cache volume is updated. In step 6, flow control moves from the cache volume 315 back to the cache mapper 310 via a callback to the cache mapper 310. In step 7, the processed I/O returns back to the file system 300 and ultimately to the initiating host 14a-14n.

Example embodiments may implement the following algorithm according to techniques described herein. A cache mapper target may be registered using one or more functions. For example, Flashcache_ctr is a constructor function may be used to construct a cache volume and is called on creation/load of the cache volume to a disk volume. Flashcache_dtr is a destructor function that can be called on cache configuration removal. Flashcache_map is a map I/O function that can be called during an I/O operation to the cache mapper (created via Flashcache_ctr).

The following pseudo code is an example embodiment of a method in accordance with the techniques described herein. The code illustrates the Flashcache_ctr function described above along with additional intelligence to queue I/O operations during cache construction, manage cache hit and miss I/O functionality, along with other functions to avoid I/O disruption in cache configuration and enable dynamic cache configuration.

--- a) flashcache_ctr functionality:
1. The following code example illustrates initiating cache configuration without taking ownership of the cache/disk volume. This code may be introduced in linux kernel dm-table.c and invokes fc_dm_get_device instead of dm_get_device so that exclusive ownership of the volume is avoided.

```
Int fc_dm_get_device(struct dm_target *ti, const char *path,
                    fmode_t mode, struct dm_dev **result)
{
        return __fc_table_get_device(ti->table, ti, path, mode, result);
}
EXPORT_SYMBOL (fc_dm_get_device);
static int __fc_table_get_device(struct dm_table *t, struct dm_target
            *ti, const char *path, fmode_t mode, struct dm_dev
            **result)
{
    int r;
    dev_t uninitialized_var(dev);
    struct dm_dev_internal *dd;
    struct block_device *bdev;
        unsigned int major, minor;
    BUG_ON(!t);
    if (sscanf(path, "%u:%u", &major, &minor) == 2) {
        /* Extract the major/minor numbers */
        dev = MKDEV(major, minor);
        if (MAJOR(dev) !=major || MINOR(dev) != minor)
            return -EOVERFLOW;
    } else {
        /* convert the path to a device */
        struct block_device *bdev = lookup_bdev(path);
        if (IS_ERR(bdev))
            return PTR_ERR(bdev);
        dev = bdev->bd_dev;
        bdput(bdev);
    }
    dd = find_device(&t->devices, dev);
    if (!dd) {
        dd = kmalloc(sizeof(*dd), GFP_KERNEL);
        if (!dd)
            return -ENOMEM;
        dd->dm_dev.mode = mode;
        dd->dm_dev.bdev = NULL;
        bdev = open_by_devnum(dev, dd->dm_dev.mode);
            if (IS_ERR(bdev))
                return PTR_ERR(bdev);
            dd->dm_dev.bdev = bdev;
        format_dev_t(dd->dm_dev.name, dev);
        atomic_set(&dd->count, 0);
        list_add(&dd->list, &t->devices);
    } else if (dd->dm_dev.mode != (mode | dd->dm_dev.mode)) {
        r = upgrade_mode(dd, mode, t->md);
        if (r)
            return r;
    }
    atomic_inc(&dd->count);
    *result = &dd->dm_dev;
    return 0;
}
void fc_dm_put_device(struct dm_target *ti, struct dm_dev *d)
{
    struct dm_dev_internal *dd = container_of(d, struct dm_dev_
                    internal, dm_dev);
    if (atomic_dec_and_test(&dd->count)) {
        if (!dd->dm_dev.bdev)
            return;
            blkdev_put(dd->dm_dev.bdev, dd->dm_dev.mode);
        dd->dm_dev.bdev = NULL;
        list_del(&dd->list);
        kfree(dd);
    }
}
```
2. Trap the block I/O make request function and update disk make request function pointer with flash cache make request using the following code.
```
    typedef struct fc_mkreq_head
    {
        int        count;
        struct list_head    list;
    } fc_mkreq_head_t;
    typedef struct fc_mkreq_table
    {
        dev_t        devno;
        make_request_fn    *mkreq_fn;
        struct list_head    list;
    } fc_mkreq_table_t;
    static int fc_intercept_io(fc_ioc_t *ioc)
    {
        int    ret = FC_FAILURE;
        dev_t    dev = (dev_t)ioc->private;
            fc_trap_dev(dev);
            printk("Intercepted the I/O of Dev :%d Successfully\n",dev);
            return (ret);
    }
    static int fc_trap_dev(dev_t dev)
    {
        int        ret = FC_FAILURE;
        struct block_device    *b_dev = bdget(dev);
        struct request_queue    *q = b_dev->bd_disk->queue;
        fc_mkreq_table_t    *mkreq = NULL;
        /* Search for the device */
        mkreq = kmalloc(sizeof(fc_mkreq_table_t), GFP_ATOMIC);
        if (!mkreq) {
            goto out;
        }
        /* Create make request hash table entry and update
        accordingly */
        mkreq->devno = dev;
        mkreq->mkreq_fn = q->make_request_fn;
     /* Trap make request of disk volume */
        spin_lock_irq(q->queue_lock);
            q->make_request_fn = fc_make_request;
        spin_unlock_irq(q->queue_lock);
        /* add make request hash table entry to hash table and increment
            hash table entry count */
        list_add_tail(&mkreq->list, &fc_mkreq_head.list);
        fc_mkreq_head.count++;
        ret = FC_SUCCESS;
    out:
        return (ret);
    }
    Introduce following function in dm.c of linux kernel:
    make request fn * fc_get_dmrequest( )
    {
        return dm_request; /* Device mapper I/O routine */
    }
    EXPORT_SYMBOL (fc_get_dmrequest)
```
3. The following flashcache make request will be invoked on trapping the disk volume make request. The following functionality is handled by this function:
    1. Queue all disk volume I/O's if the cache configuration is still pending.
    2. Decide whether to invoke device mapper or disk make request.
        a) Invoke device mapper make request to split and process the bulk I/O so that control comes to 'flashcache_map' function
        which has caching intelligence.
        b) Invoke disk make request if this is invoked by 'flashcache_map' function to perform actual I/O operation on the disk volume.
Example code to distinguish between cache mapper bio and normal bio.
```
    fc_make_request(struct request_queue q, struct bio *bio)
    {
        /* Queue I/O if the config is in progress */
        If (config_progress) {
            /* queue the I/O and process later with
                fc_make_request */
        }
        if (bio->bi_private ==
            (void *)((unsigned long) flashcache_io_
            callback)) {
            /* bio fired by flash cache device mapper
            module*/
            mkreq = fc_orig_make_request(src_dev);
            /* Get the request queue 'q' of disk device */
            mkreq(q, bio);
        }else {
            /* Get the request queue 'q' of mapper device */
            dm_mkreq = fc_get_dmrequest( );
            dm_mkreq(q, bio);
        }
    }
```

-continued

The flashcache_dtr function may include code (not shown) to perform the following operations:
1. Restore disk make request and process I/O operations in the queue.
2. Sync data from the cache volume to the disk volume based on a cache removal policy (e.g., fast/slow).
3. Release cache object created as part cache creation.

The subject matter described herein for relocating mapped data to facilitate drive spin down in data storage systems may be implemented in hardware, software, firmware, or any combination thereof. As such, the terms "technique" or "logic" as used herein may refer to software in combination with hardware and/or firmware for implementing the feature being described. In one example implementation, the subject matter described herein may be implemented using a non-transitory computer readable medium having stored thereon computer executable instructions that when executed by the processor of a computer perform steps.

Exemplary non-transitory computer readable media suitable for implementing the subject matter described herein include disk memory devices, chip memory devices, programmable logic devices, and application specific integrated circuits. In addition, a computer program product that implements the subject matter described herein may be located on a single device or computing platform or may be distributed across multiple devices or computing platforms.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for use in configuring I/O cache, the method comprising:
    identifying a file system and a disk volume;
    mounting the file system on the disk volume;
    determining that at least a portion of the disk volume will be unavailable for I/O for at least a first time;
    creating a cache mapper logical volume in response to the determining that at least the portion of the disk volume will be unavailable for I/O for at least the first time;
    creating a cache volume from an existing cache storage unit, wherein the cache mapper logical volume is mounted on the disk volume and the cache volume, and wherein the cache volume is created on a solid state drive; and
    relocating data from the disk volume to the cache volume;
    wherein I/O operations are directed between the file system and the disk volume in response to cache volume creation not being completed; and
    wherein I/O operations are directed from the file system to the cache volume in response to cache volume creation being completed.

2. The method of claim 1, further comprising queuing I/O operations during cache volume creation.

3. The method of claim 2, farther comprising directing queued I/O operations to the cache volume after cache volume creation.

4. The method of claim 1, wherein the cache mapper is created while the file system is mounted.

5. The method of claim 1, further comprising including dynamically deconstructing the cache mapper and cache volume in response to a destructor request.

6. The method of claim 1, further comprising dynamically deconstructing the cache mapper and cache volume while the file system is mounted.

7. The method of claim 1, further comprising, in response to a cache hit, directing I/O operations to the cache volume for processing.

8. The method of claim 1, further comprising, in response to a cache miss, directing I/O operations to the disk volume for processing.

9. The system of claim 1, wherein the instructions are further executable to queue I/O operations during cache volume creation.

10. The system of claim 9, wherein the instructions are further executable to direct queued I/O operations to the cache volume after cache volume creation.

11. The method of claim 1, wherein the disk volume from which data is relocated has been scheduled to undergo a disk spin down.

12. The method of claim 11, further comprising relocating the data back to the disk volume responsive to one or more disks for the disk volume from which data is relocated spinning back up.

13. The method of claim 1, further comprising relocating the data back to the disk volume once the first time concludes, the relocating the data back to the disk volume including writing to the disk volume any changes to the data that occurred while located at the cache volume.

14. A system, comprising:
    a processor; and
    a memory accessible to the processor and bearing instructions executable by the processor to:
    identify a file system and a disk volume;
    mount the file system on the disk volume;
    determine that at least a portion of the disk volume will be unavailable for I/O for at least a first time;
    create a cache mapper logical volume in response to the determination that at least the portion of the disk volume will be unavailable for I/O for at least the first time;
    create a cache volume from an existing cache storage unit, wherein the cache mapper logical volume is mounted on the disk volume and the cache volume, and wherein the cache volume is created on a solid state drive; and
    relocate data from the disk volume to the cache volume;
    wherein I/O operations are directed between the file system and the disk volume in response to cache volume creation not being completed; and
    wherein I/O operations are directed from the file system to the cache volume in response to cache volume creation being completed.

15. The system of claim 14, wherein the instructions are further executable to create the cache mapper while the file system is mounted.

16. The system of claim 14, wherein the instructions are further executable to dynamically deconstruct the cache mapper and cache volume in response to a destructor request.

17. The system of claim 14, wherein the instructions are further executable to deconstruct the cache mapper and cache volume while the file system is mounted.

18. The system of claim 14, wherein the instructions are further executable to, in response to a cache hit, direct I/O operations to the cache volume for processing.

19. The system of claim 14, wherein the instructions are further executable to, in response to a cache miss, direct I/O operations to the disk volume for processing.

20. A computer program product stored in a non-transitory computer readable storage medium, the computer program product comprising instructions that, when executed by an information handling system, causes the information handling system to perform actions to:
- identify a file system and a disk volume;
- mount the file system on the disk volume;
- determine that at least a portion of the disk volume will be unavailable for I/O for at least a first time;
- create a cache mapper logical volume in response to the determination that at least the portion of the disk volume will be unavailable for I/O for at least the first time;
- create a cache volume from an existing cache storage unit, wherein the cache mapper logical volume is mounted on the disk volume and the cache volume, and wherein the cache volume is created on a solid state drive; and
- relocate data from the disk volume to the cache volume;
- wherein I/O operations are directed between the file system and the disk volume in response to cache volume creation not being completed; and
- wherein I/O operations are directed from the file system to the cache volume in response to cache volume creation being completed.

* * * * *